United States Patent [19]
Nespoli

[11] Patent Number: 5,082,225
[45] Date of Patent: Jan. 21, 1992

[54] CLIP FOR SECURING EYEGLASSES TO A SUNVISOR

[76] Inventor: Livio S. Nespoli, 1518 Cole Creek Dr., Omaha, Nebr. 68114

[21] Appl. No.: 461,983

[22] Filed: Jan. 8, 1990

[51] Int. Cl.$^5$ .............................................. A47B 96/06
[52] U.S. Cl. .............................. 248/231.8; 248/316.7; 248/902
[58] Field of Search ...................... 248/902, 231.8, 229, 248/309.1, 316.7; 211/13

[56] References Cited

U.S. PATENT DOCUMENTS

| | | | |
|---|---|---|---|
| 2,445,606 | 7/1948 | Davis | 248/231.8 |
| 4,397,438 | 8/1983 | Chapman | 248/231.8 X |
| 4,809,406 | 3/1989 | Tsai | 248/902 X |
| 4,878,641 | 11/1989 | Vogt | 248/902 X |
| 4,941,634 | 7/1990 | Gomes et al. | 248/902 X |

Primary Examiner—Ramon O. Ramirez

[57] ABSTRACT

Apparatus for securing sunglasses and driving glasses to a sunvisor, having an "S"shaped body including a clip which protrudes at an upward angle from the body to resiliently bias the clip closely to the body. The bow at the end of the clip is adapted to accept both the temples and the bridges of various sizes and styles of sunglasses and driving glasses. The leg is the bottom extension of the body and is adapted to support either the temples or the bridge of the sunglasses or driving glasses. The leg supports the temples and prevents them from hanging down and obscuring the drivers vision. Also a clamp at the top of the body is provided to mount the apparatus to sunvisors. The apparatus is injection molded with a pliant plastic material which will not scratch or misform either sunglasses or driving glasses.

4 Claims, 3 Drawing Sheets

CLIP FOR SECURING EYEGLASSES TO A SUNVISOR

BRIEF DESCRIPTION OF THE INVENTION

This invention relates to an apparatus for securely storing both sunglasses and driving glasses. The apparatus is designed to be attached to sunvisors in vehicles to provide both easy entry for storage when sunglasses and driving glasses are not in use, and easy and convenient withdrawal of sunglasses and driving glasses when needed.

BACKGROUND OF THE INVENTION

In today's market, sunglasses are not only a necessity, they are part of the American wardrobe, and they can be very costly. The growth rate of sunglass sales per year since 1983 is nothing less than staggering. At more than a 6% per year growth rate the 180,000,000 pairs sold in 1988 is only overshadowed by the revenue these glasses generated. These previous facts raise questions. Why, year after year, are more sunglasses being sold? In fact, why is everyone buying a new pair of sunglasses every year? A simple answer to those questions is that people are either losing, breaking, or scratching their sunglasses or driving glasses. This supports our belief that an apparatus which prevents partial or complete damage to sunglasses and driving glasses will be widely accepted in the market place.

The apparatus will also prevent the vehicles operator from diverting his attention to search for his sunglasses or driving glasses. This search is both inconvenient and dangerous.

OBJECTS AND SUMMARY OF THE INVENTION

The object of the apparatus is that it will securely hold and protect, sunglasses and driving glasses on the sunvisor to allow convenient access. The apparatus will accomplish this without touching the lenses. Because the apparatus only touches the bridge and temples of the sunglasses or eyeglasses there is easy insertion and extraction of the sunglasses. The apparatus prevents the sunglasses or eyeglasses from escaping the security of the apparatus due to expected and unexpected vehicle motion.

DETAILED DESCRIPTION OF THE INVENTION

Figure 1:
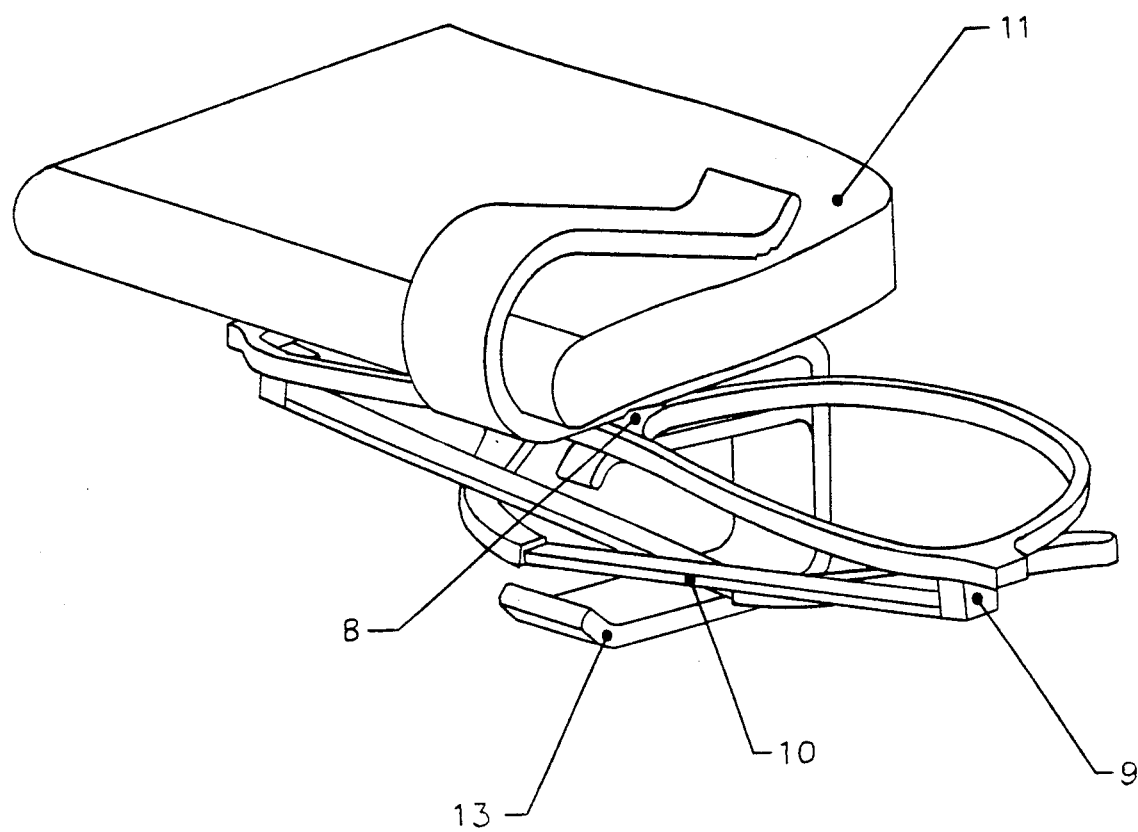
FIG. 1 is a perspective view of the mounting apparatus in accordance with this invention, with mounted eyeglasses, attached to a sunvisor.
Figure 2:
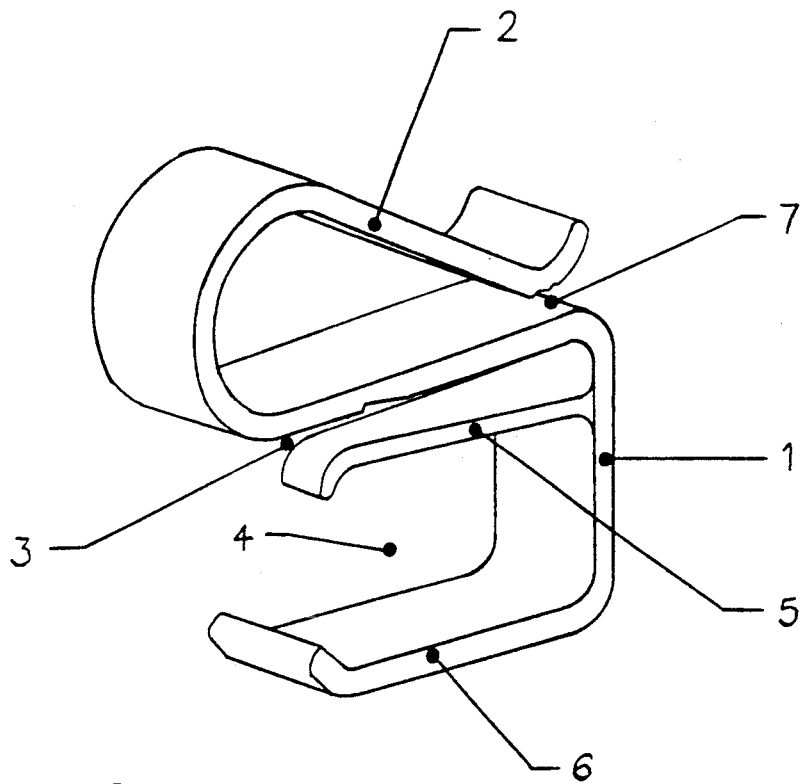
FIG. 2 is a perspective view of the mounting apparatus in accordance with this invention.
Figure 3:
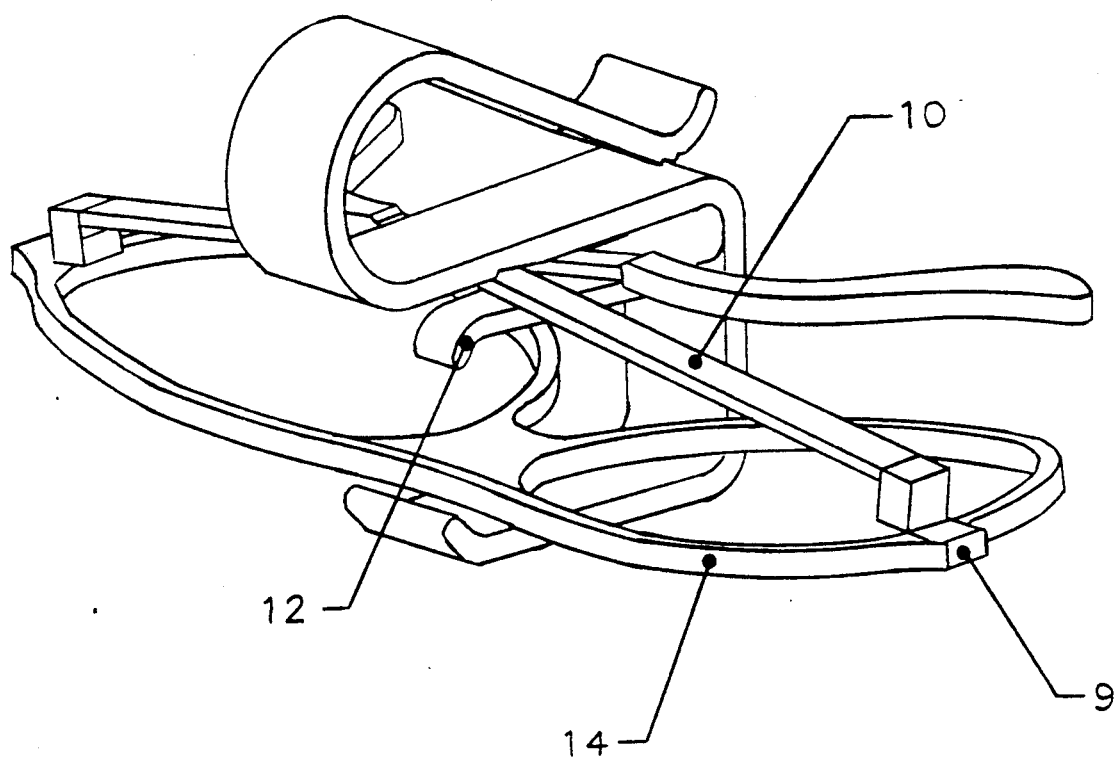
FIG. 3 is another perspective view of the mounting apparatus in accordance with this invention, with differently mounted eyeglasses.

Referring to FIGS. 1-3, the mounting apparatus includes a body 1 which is made of a pliant material. The mounting apparatus' body 1 is shaped in the form presented in FIG. 1 is completed by injection molding. The clamp 2 is adapted to secure the mounting apparatus' body 1 to any thin object, such as a vehicles sunvisor 11. The clamps opening 7 may or may not be closed depending upon the type of object the mounting apparatus will be attached. The clip 5 extends out from the mounting apparatus' body 1 and is adapted to support the bridge 8 or the temples 10 of the eyeglasses 9. At the end of the clip 5 is the bow 12 which is adapted to ease the insertion of any thin object such as the bridge 8 or the temples 10 of the eyeglasses 9. The clip is adapted to secure any thin object such as the bride 8 or the temples 10 of eyeglasses 9. The clips opening 3 may or may not be closed depending on whether or not the eyeglasses 9 are inserted. The support area 4 of the mounting apparatus is adapted to contain the face 16 of the eyeglasses, or the temples 10 of the eyeglasses. The leg 6 is at the base of the support area 4 and is adapted to support the face 16 of eyeglasses, or the temples 10 of eyeglasses. The crimp 13 at the end of the leg 6 is adapted to not allow either the temples 10 or the bridge to exit the support area 4 before withdrawal of the eyeglasses.

What is claimed is:

1. Apparatus for securing eyeglasses to a sunvisor, the apparatus comprising a S-shaped body having a top, center and bottom portion; the top portion extending outwardly from the center portion and then inwardly toward the center portion forming a clamp for securing the body to the sunvisor; the bottom portion extending outwardly from said center portion forming a base for receiving the front area or the temples of the eyeglasses; a leg extending outwardly from said center portion and located between the top and the bottom portions, said leg forming a clip adapted to support in cooperation with the base the bridge or temples of the eyeglasses.

2. An apparatus as defined in claim 1 wherein the clip has a bow to ease in the insertion of the eyeglasses.

3. An apparatus as defined in claim 1 wherein the base has a crimp to prevent accidental removal of the eyeglasses.

4. An apparatus as defined in claim 1 wherein said body is made of plastic.

* * * * *